United States Patent
Eul et al.

(10) Patent No.: US 11,447,077 B2
(45) Date of Patent: Sep. 20, 2022

(54) PAVING SCREED WITH QUICK COUPLING FOR EXTERNAL CONTROL STATION

(71) Applicant: JOSEPH VOEGELE AG, Ludwigshafen/Rhein (DE)

(72) Inventors: Achim Eul, Mannheim (DE); Karl-Heinz Jungmann, Biblis (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 223 days.

(21) Appl. No.: 16/870,102

(22) Filed: May 8, 2020

(65) Prior Publication Data
US 2020/0353874 A1 Nov. 12, 2020

(30) Foreign Application Priority Data
May 8, 2019 (EP) .................................... 19173275

(51) Int. Cl.
*B60R 11/00* (2006.01)
*E01C 19/40* (2006.01)

(52) U.S. Cl.
CPC ............ *B60R 11/00* (2013.01); *E01C 19/405* (2013.01); *B60R 2011/004* (2013.01); *B60R 2011/0064* (2013.01); *E01C 2301/16* (2013.01)

(58) Field of Classification Search
CPC .............. B60R 11/00; B60R 2011/004; B60R 2011/0064; E01C 19/405; E01C 2301/16
See application file for complete search history.

(56) References Cited

U.S. PATENT DOCUMENTS 4,969,830 A * 11/1990 Daly ...................... G06F 1/1632
361/679.41
5,245,511 A * 9/1993 Watanabe .............. H04B 1/082
381/86
(Continued)

FOREIGN PATENT DOCUMENTS

| CN | 104035341 A | 9/2014 |
| CN | 104372729 A | 2/2015 |

(Continued)

OTHER PUBLICATIONS

Extended European Search Report dated Sep. 30, 2019, U.S. Appl. No. 19173275.9-1132, Applicant Joseph Voegele AG, 4 Pages.

(Continued)

*Primary Examiner* — Brian D Nash
(74) *Attorney, Agent, or Firm* — Brooks Kushman P.C.

(57) ABSTRACT

The present disclosure refers to a paving screed for compacting a paving material, comprising at least one external control station for an operator for controlling at least one operating parameter adjustable on the screed, for example a power of a screed heating system. The external control station comprises a support and at least one operating panel detachably attached thereto as an input unit for the operator for setting the at least one operating parameter. The operating panel is attached to the support by means of a plug connection device having a first plug connector part with at least one first electrical contact part integrated thereon and a second plug connector part with at least one second electrical contact part integrated thereon. Furthermore, an electrical coupling of the two electrical contact parts integrated on the plug connector parts can be produced by a mechanical coupling of the two plug connector parts.

20 Claims, 5 Drawing Sheets

(56) References Cited

U.S. PATENT DOCUMENTS

| | | | | |
|---|---|---|---|---|
| 5,323,291 | A * | 6/1994 | Boyle | G06F 1/1632 361/679.42 |
| 6,276,613 | B1 * | 8/2001 | Kramer | B01F 25/45241 134/102.2 |
| 6,504,710 | B2 * | 1/2003 | Sutton | G06F 1/1656 361/679.41 |
| 6,594,146 | B2 * | 7/2003 | Frangesch | A61B 5/00 361/679.02 |
| 7,209,124 | B2 * | 4/2007 | Hunt | G06F 1/1632 345/173 |
| 7,679,902 | B2 * | 3/2010 | Thompson | G06F 1/1632 361/679.44 |
| 8,776,941 | B2 | 7/2014 | Herzberg | |
| 8,873,233 | B2 * | 10/2014 | Reber | G06F 1/1632 361/679.01 |
| 8,890,046 | B2 | 11/2014 | Eul et al. | |
| 9,078,342 | B2 | 7/2015 | Eul et al. | |
| 9,434,319 | B2 * | 9/2016 | Oldani | B60R 7/06 |
| 10,029,525 | B2 | 7/2018 | Gotterbarm et al. | |
| 10,209,739 | B2 | 2/2019 | Nessel | |
| 2006/0025914 | A1 | 2/2006 | Buschmann | |
| 2006/0045620 | A1 * | 3/2006 | Olson | E01C 19/006 404/101 |
| 2007/0088858 | A1 * | 4/2007 | Eul | E01C 19/48 710/10 |
| 2011/0236131 | A1 * | 9/2011 | Heindtel | E01C 19/48 404/83 |
| 2013/0258567 | A1 * | 10/2013 | Eul | E01C 19/48 361/679.01 |
| 2014/0046488 | A1 * | 2/2014 | Eul | G01D 21/00 700/275 |
| 2014/0181347 | A1 * | 6/2014 | Hamel | H04M 1/04 710/304 |
| 2014/0192480 | A1 * | 7/2014 | Winkler | G06F 1/1632 361/700 |
| 2014/0223065 | A1 * | 8/2014 | Jolda | B60R 11/0252 710/303 |
| 2014/0294503 | A1 * | 10/2014 | Ramos | E01C 19/42 404/118 |
| 2015/0337505 | A1 * | 11/2015 | Stallgies | E01C 19/48 404/118 |
| 2016/0266610 | A1 * | 9/2016 | Nessel | B60R 11/0252 |
| 2016/0289902 | A1 * | 10/2016 | Eul | G07C 5/02 |
| 2019/0375343 | A1 * | 12/2019 | Erdtmann | H01R 33/97 |
| 2020/0353874 | A1 | 11/2020 | Eul et al. | |

FOREIGN PATENT DOCUMENTS

| | | |
|---|---|---|
| CN | 207625634 U | 7/2018 |
| CN | 212956049 U | 4/2021 |
| EP | 2 578 748 A1 | 4/2013 |
| EP | 2 644 454 A1 | 10/2013 |
| EP | 2644454 A1 | 10/2013 |
| EP | 3 067 774 A1 | 9/2016 |
| JP | H04328284 A | 11/1992 |
| JP | 2010-110617 A | 5/2010 |
| JP | 2011-156895 A | 8/2011 |
| JP | 2013-079571 A | 5/2013 |
| JP | 2013-091342 A | 5/2013 |
| JP | 2013-217188 A | 10/2013 |
| JP | 2013-224575 A | 10/2013 |
| JP | 2016-180300 A | 10/2016 |
| WO | 2015/014663 A2 | 2/2015 |
| WO | 2019/026830 A1 | 2/2019 |

OTHER PUBLICATIONS

Chinese First Office Action dated Jul. 2, 2021 (with English Machine Translation), Application No. 202010375890.X, 17 Pages.
Japanese Notice of Reasons for Refusal dated Jul. 28, 2021 (with English Machine Translation), Application No. 2020-081124, 9 Pages.

* cited by examiner

PAVING SCREED WITH QUICK COUPLING FOR EXTERNAL CONTROL STATION

CROSS-REFERENCE TO RELATED APPLICATIONS

This application claims foreign priority benefits under 35 U.S.C. § 119(a)-(d) to European patent application number EP 19 173 275.9, filed May 8, 2019, which is incorporated by reference in its entirety.

TECHNICAL FIELD

The present disclosure refers to a paving screed for compacting a paving material.

BACKGROUND

It is well known that road finishers have a movably supported paving screed for producing a new road surface. It is also known that an external control station with an operating panel is optionally available at the paving screed for the operator, enabling him to set specific paving parameters at the paving screed.

EP 2 644 454 A1 discloses an external control station of a paving screed with an operating panel provided on it. The operating panel has an attachment section on its underside, which allows it to be attached to the external control station. In one variant, the operating panel with its attachment section can be attached to a tubular element on a support of the paving screed and secured to it. Furthermore, the operating panel is provided with an electrical connection for an electrical coupling process on its underside, but separate from the attachment section in terms of both design and function.

EP 2 578 748 A1 also discloses an external control station for a paving screed. The external control station has an operating panel which is mounted in a mechanical receiving member. In addition, the operating panel has electrical connections on its underside.

For the aforementioned known external control stations, the respective operating panels must be attached to and removed from the respective external control station in several steps. In particular, separate work steps must be carried out one after the other for the mechanical and electrical coupling of the respective operating panels at the external control station.

In addition, a separate electrical cable connects the support with the operating panel at the known external control stations. When the operating panel is removed, for instance, in order to remove it from the road finisher overnight, the cable should also be disconnected, which results in several removal steps overall. It is undesirable to leave the cable without being connected to the operating panel.

All in all, there is therefore a certain potential for improvement with regard to the known practice, especially in terms of ergonomics, for attaching and removing the operating panel.

SUMMARY

An object of the disclosure is to improve the well-known practice described above in such a way that an operating panel can be easily attached to and removed from the external control station of a paving screed.

The disclosure refers to a paving screed for compacting a paving material, comprising at least one external control station for an operator to control at least one operating parameter adjustable on the paving screed, for example a paving width, a speed of the auger and/or height adjustment of the auger. The external control station comprises a support and at least one operating panel detachably attached thereto as an input unit for the operator for setting the at least one operating parameter, the operating panel being attached to the support by means of a plug connection device.

In accordance with the disclosure, the plug connection device comprises a first plug connector part with at least one first electrical contact part integrated thereon and a second plug connector part with at least one second electrical contact part integrated thereon, wherein an electrical coupling of the two electrical contact parts integrated on the two plug connector parts can be produced by a mechanical coupling of the two plug connector parts.

As the respective electrical contact parts are integrally formed on the respective connector parts, i.e., not on coupling points that are functionally or locally separate from the connector parts, the operating panel can be connected both mechanically and electrically to the external control station by means of a simplified coupling procedure. The integral design of the plug connection device ensures, in particular, that correct mechanical attachment of the operating panel simultaneously ensures that reliable electrical coupling can be achieved, i.e., by means of the same coupling process or work step, so that the operating panel can be used as an input unit for controlling the paving screed and/or the road finisher.

In the disclosure, the plug connection device is designed in particular as a quick coupling for easy mounting and dismounting of the operating panel. This reduces the number of work steps required for attaching and detaching the operating panel to and from the paving screed's external control station. In addition, a separate connecting cable for electrical connection can be dispensed with, thus reducing production costs in particular. The elimination of a separate electrical connecting cable on site can also be advantageous with regard to (occupational) safety at the job site.

All in all, an embodiment according to the disclosure may enable ergonomic handling of the operating panel by means of the plug connection device provided at the external control station of the paving screed. In particular, the disclosure makes it possible to electrically connect the operating panel at the external operating station of the paving screed at the external operating station by means of a mechanical coupling process simultaneously, i.e., without an additional installation step. Thus, both mechanical and electrical coupling at the external control station can be carried out by means of a standardized, particularly simple operation that benefits the operator.

Preferably, the first plug connector part is integrally formed on the support and the second plug connector part is integrally formed on the operating panel of the external control station. This allows the respective plug connector parts to be connected intuitively by the operator.

For a stable and secure mounting of the operating panel on the external control station, it is useful if the plug connection device has a locking mechanism. This allows the operating panel to be attached to the support, particularly in such a way that it is secured against dropping.

Preferably the locking mechanism provides at least one spring-loaded handle on the operating panel. Preferably, the handle is located on the underside of the operating panel and/or preloaded in a locking position by means of a spring force. One variant provides for the handle to be attached to the underside of the operating panel, whereby an operator reaches the handle by reaching behind the operating panel to operate it manually.

Preferably, the handle is designed as a signaling device that is visually perceptible to the operator for proper attachment of the operating panel to the support of the external control station. An advantageous variant provides that the handle protrudes at least partially over an edge of the operating panel, visible to an operator, as an indication of correct attachment of the operating panel to the support. For example, a portion of the handle could protrude into a recess designed to hold the operating panel, or at least partially protrude beyond a side wall of the operating panel to indicate that the operating panel is properly attached to the support.

According to a variant, a correct mechanical and/or electrical coupling on the plug connection device can be indicated by a symbol on a display of the operating panel. At least one sensor unit can be formed on the external control station to detect a corret mechanical and/or electrical coupling.

A particularly targeted connection of the operating panel at the external control station can be achieved by the fact that the plug connection device has a linear guide for connecting the two plug connector parts. By means of the linear guide, the operator can be actively helped to fix the operating panel correctly, i.e., both mechanically and electrically, to the external control station of the paving screed.

Preferably, a lighting unit for illuminating the linear guide is provided on the external control station, especially on an upper side of the support. It would be advantageous if the lighting unit could be switched on automatically by removing the operating panel. In addition to its actual function of illuminating the linear guide, the lighting unit can also serve as an optical means of indicating the paving width set, i.e., indicating lateral adjustment of the paving screed, especially when working in bad weather and/or at night.

The lighting unit may be configured in such a way that, when the operating panel is in place, it is optically perceptible as background lighting for the operating panel, at least on the periphery. Optionally, the lighting unit can be configured to illuminate the handle of the locking mechanism when the operating panel is attached to the external control station.

A particularly simple but practical design from a design point of view provides that the linear guide has at least two guide rails arranged in parallel. The mechanical as well as electrical coupling process is thus particularly easy to perform. LED strips can be formed along the guide rails, which are particularly useful for the lighting unit of the linear guide.

Preferably, at the end of the coupling process, the electrical coupling for the operating panel is established without cables. This makes the coupling process easy and reduces the overall number of components on the road finisher used on the job site, thus ensuring a particularly practical and ergonomic operation.

An improved design variant provides that a correct coupling process can be confirmed by an audible signal, if necessary, even while the machine is running. An audible locking noise could be imagined, which could be generated by the locking mechanism, for example, by proper mechanical attachment of the operating panel, which also creates the electrical connection.

For further improvement, it can be provided that the operating panel at the external control station is arranged on a height-adjustable and/or inclinable base plate of the support. This allows the operator to adjust the height and orientation of the operating panel to suit his individual needs.

An advantageous design provides that the support has a movably mounted protective flap formed thereon for the connector device. In particular, the protective flap can be configured so that, in the event of the operating panel being removed from the support, it is pressed under spring force against the electrical contact part of the support in order to protect its electrical connections from the effects of weather and dirt on the construction site. A protective flap of similar design in terms of function may also be provided on the operating panel.

For complex applications, it would be useful if the external control station had a further, separately designed operating panel as an input unit for the operator for setting at least one operating parameter of the paving screed, the further operating panel being detachably attached to the support by means of a plug connection device provided specifically for this purpose, which is designed in a comparable manner (i.e., has handling advantages similar to those of the operating panel described above), particularly in terms of function and technology, for establishing a mechanical and electrical coupling. In this way, specific control or setting operations on the paving screed and/or the road finisher can be carried out separately by means of the respective operating panels attached separately to the support. Preferably, the two separate operating panels can be used to control different functional modules on the road finisher and/or the paving screed.

It would be particularly ergonomic in use, but also visually advantageous, if the two operating panels on the support were arranged next to or above each other on a common mounting plane. This way, the two operating panels can be visually perceived essentially as a common control platform at the paving screed's external control station. By distributing the respective operating and control functions to different operating panels, the operator can remove, depending on application, the respective operating panel from the external control station, while the other panel remains attached to it. This allows ergonomic operation on the job site.

An advantageous variant provides that the two operating panels can be attached to the support, in particular pushed on and removed, in opposite plug-in or mounting directions to establish the respective mechanical and electrical coupling. This allows the respective operating panels to be mounted compactly on the support, close together.

It is particularly useful if the external control station is attached to a side-shifting unit of the paving screed. The operating panel can thus be moved sideways depending on the paving width produced, and is thus located at the side of the paving screed within easy reach of an operator moving along there.

When producing large paving widths, in particular, it may be advantageous if the paving screed has two external control stations mounted on opposite sides of the paving screed. The two operating panels may have common or different input and control functions.

Preferably, the plug connection device has pressure means adapted to increase an electrical contact pressure at the end of the coupling process. It would be conceivable that the handle mentioned above in connection with the locking mechanism is additionally designed as a pressure means to ensure the increase of the electrical contact pressure between the respective electrical contact parts at the end of the coupling process.

According to a variant, at least one seal is assigned to the electrical contact parts on the plug connection device, which, when the operating panel is attached to the external control station, particularly ensures that no moisture or dirt penetrates into the electrical contact area.

The disclosure also refers to a road finisher for producing a road surface with a paving screed of the type described above in accordance with the disclosure.

BRIEF DESCRIPTION OF THE DRAWINGS

Embodiments of the disclosure are explained in more detail with reference to the following Figures.

DETAILED DESCRIPTION

Figure 1:
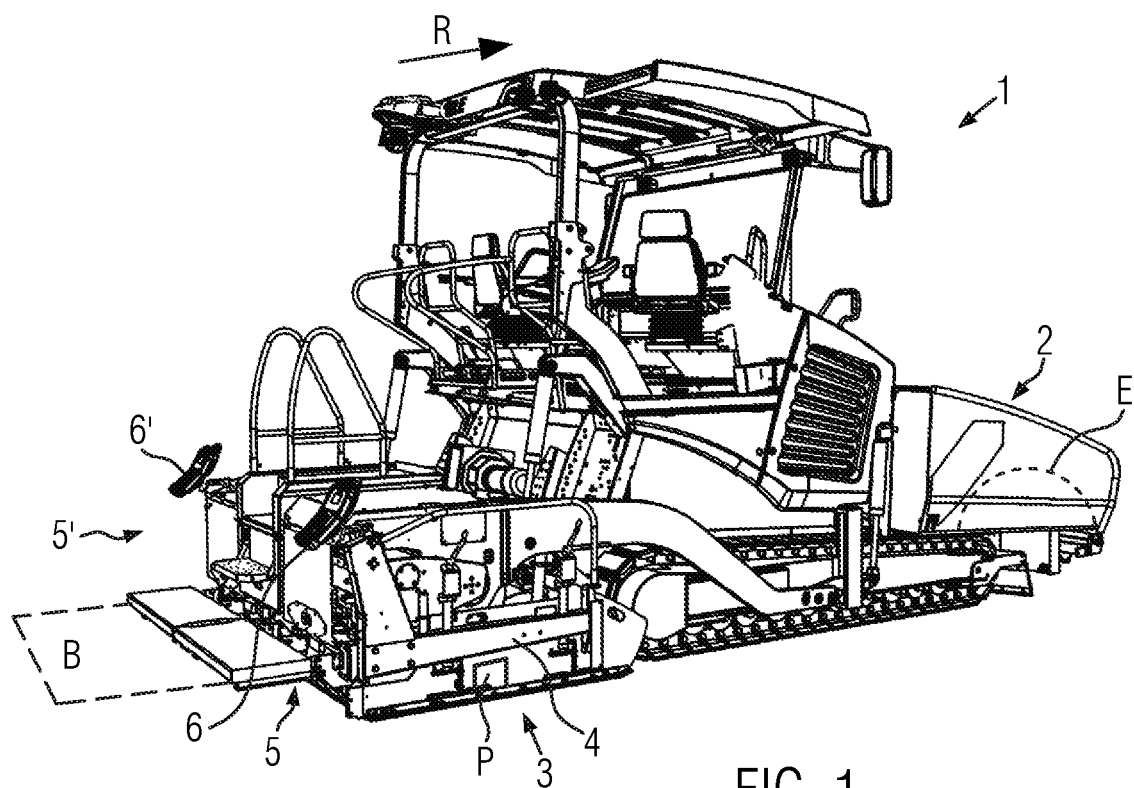
FIG. 1 shows a road finisher for producing a road surface, including a paving screed attached thereto.

FIG. 1 shows a road finisher 1 for paving a road surface B. The road finisher 1 is equipped with a hopper 2 for receiving a paving material E. The paving material E is transported from the hopper 2 by means of a longitudinal conveyor (not shown) to the rear against a paving direction R to a paving screed 3 which is movably mounted on the road finisher 1. The paving material E is spread out in front of the paving screed 3 and compacted by the paving screed 3 to produce the new road surface B.

The paving screed 3 is equipped with a side shining device 4 with an external control station 5 attached thereon. An operating panel 6 as a functional input unit for an operator is attached to the external control station 5. The operating panel 6 can be used to set a large number of operating parameters for the paving screed 3 and/or the road finisher 1 and to call up operating parameters currently set for operation. FIG. 1 shows schematically an operating parameter P, for example, concerning an adjustable output of a screed heating system installed on the paving screed 3.

FIG. 1 also shows an external control station 5' mounted on the other side of the paving screed 3 with an additional operating panel 6' attached to it, which can be attached and removed in the same way as the operating panel 5.

Figure 2:
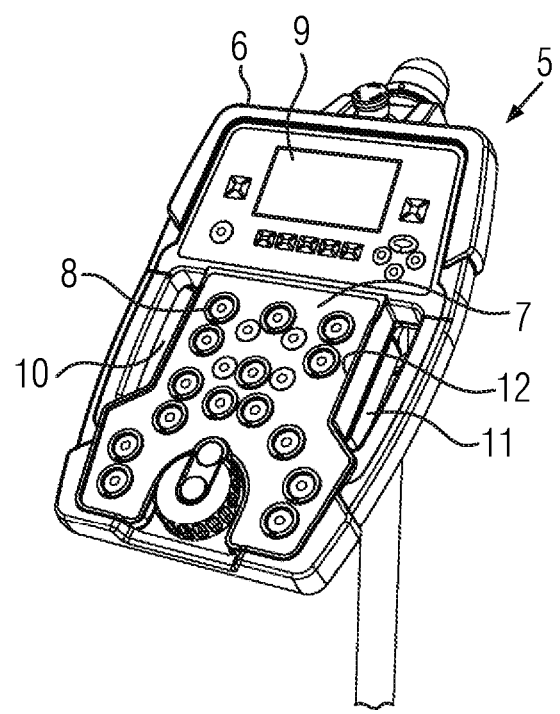
FIG. 2 shows an isolated view of an external control station of the paving screed.

FIG. 2 shows in isolated view the external control station 5 of the paving screed 3. The operating panel 6 mounted on the external control station 5 according to FIG. 2 comprises at its top side 7 a plurality of input switches 8 for the operator. In addition, the operating panel 6 has a display 9 in an upper section on its top side 7 for showing currently set operating parameters P, which can, however, optionally be designed as touch display for setting various operating parameters P. The display 9 can also indicate that the operating panel 6 is correctly attached to the external control station 5.

FIG. 2 shows that the operating panel 6 has lateral engagement recesses 10 for holding the operating panel 6 on both sides. In addition, FIG. 2 shows that a handle 11 protrudes into the right-hand engagement recess 10, protruding over a lateral edge 12 of the operating panel 6, visible to the operator, to indicate to the operator by mechanical means that the operating panel 6 is correctly attached.

Figure 3:
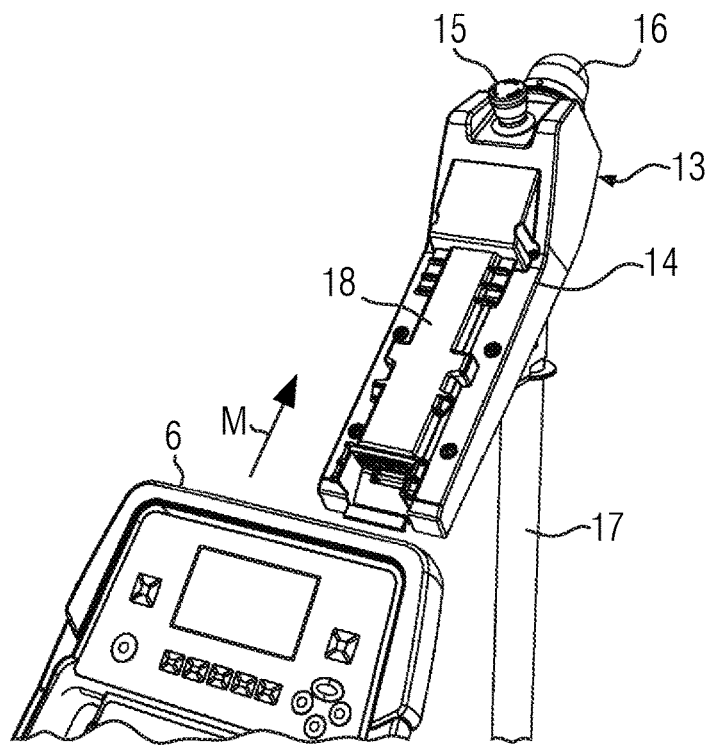
FIG. 3 shows the external control station of FIG. 2 with the operating panel removed.

FIG. 3 shows a support 13 of the external control station 5 without the operating panel 6 mounted on it. The support 13 is designed in the form of a mounting saddle 14 on which the operating panel 6 can be slid along a mounting direction M. In addition, an emergency stop switch 15 for stopping the paving operation is provided on the support 13, separated from the mounting saddle 14. In addition, FIG. 3 shows that the support 13 is equipped with a signal unit 16, which can be used in particular to indicate the position of the external control station 5, for example to avoid collisions with the external control station 5 during construction work.

In FIG. 3 the support 13 is mounted on a mounting tube 17 in a height-adjustable manner. FIG. 3 also shows a base plate 18, which is formed on the mounting saddle 14 of the support 13. When resting on the base plate 18, the operating panel 6 can be placed in a stable position if it is attached to the support 13 of the external control station 5.

Figure 4:
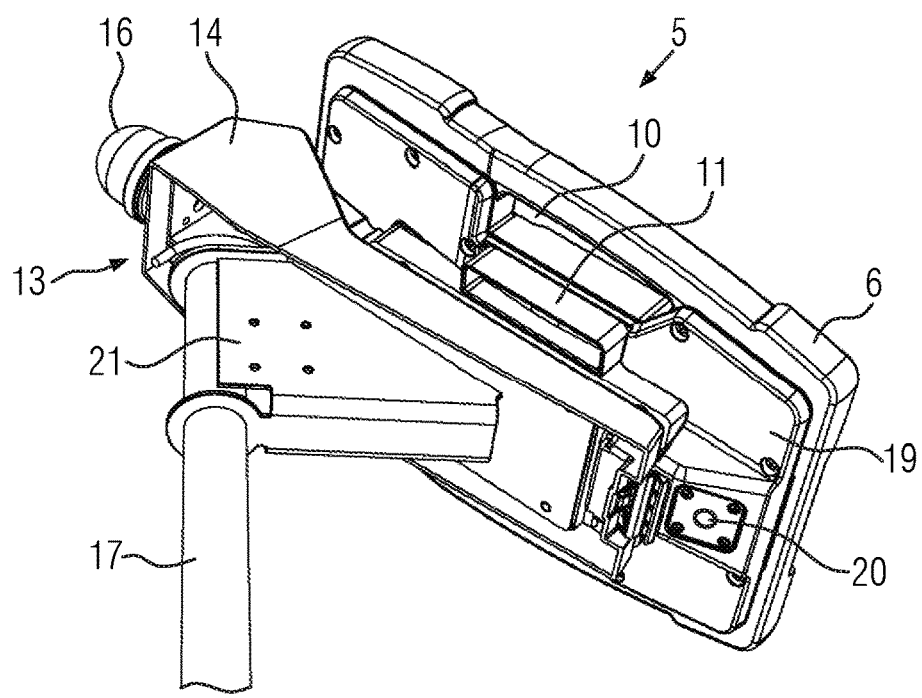
FIG. 4 shows the external control station of FIG. 2 from a view shown from below.

FIG. 4 shows the external control station 5 from a view from below. The operating panel 6 has an underside 19, by which the operating panel 6 is attached to the support 13. The underside 19 of the operating panel 6 is provided with a ground spotlight 20. The ground spotlight 20 can be used to illuminate the subgrade directly below the operating panel 6, in particular a terminal edge of the newly produced road surface B.

FIG. 4 also shows a mounting part 21, which attaches the support 13 to the mounting pipe 17. The mounting part 21 is designed to support the support 13 in a height-adjustable manner and to rotate it around the longitudinal axis of the mounting tube 17.

Figure 5:
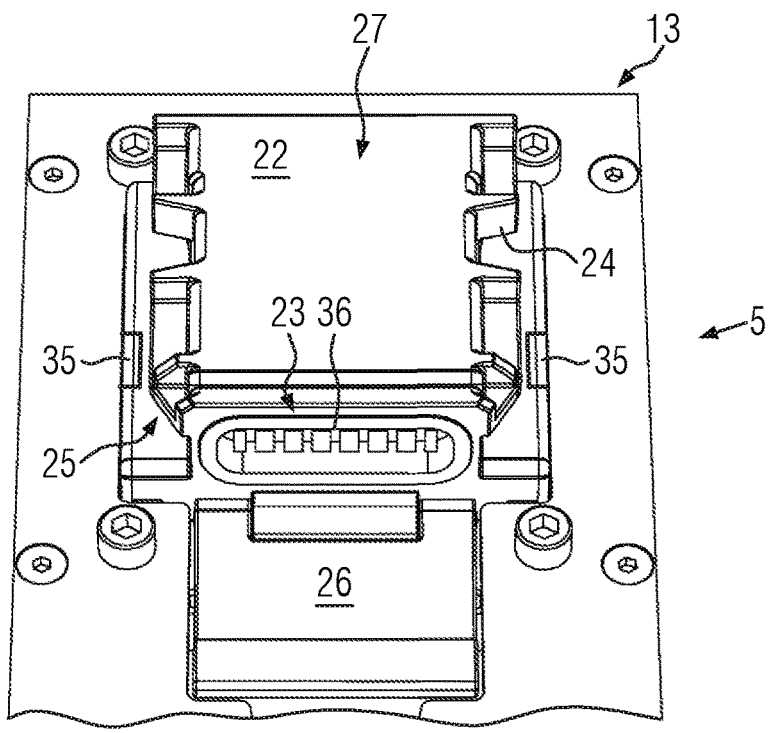
FIG. 5 shows a part of the plug connection device formed on the support of the external control station.

FIG. 5 shows a part of the support 13 of the external control station 5. FIG. 5 shows a first connector part 22 on the support 13 with an integrated first electrical contact part 23. The first connector part 22 has two parallel guide rails 24. On the support 13, the two guide rails 24 form a linear guide 25. The linear guide 25 comprises a lighting unit 35 for illuminating the respective guide rails 24.

In addition, FIG. 5 shows a protective flap 26, which is assigned to the first electrical contact part 23. When the operating panel 6 is not mounted on the support 13, the first electrical contact part 23 can be covered by the protective flap 26 to prevent the first electrical contact part 23 from being exposed to the weather and from becoming soiled. In addition, in FIG. 5, the first electrical contact part 23 is assigned a seal 36 running around it.

In FIG. 5, the first plug connector part 22 provided on the support 13 is designed as part of a plug connection device 27, which is used when attaching and removing the operating panel 6 to the support 13. The plug connection device 27 is formed from the first plug connector part 22 together with the second plug connector part 28, now described in conjunction with FIG. 6, to allow the operating panel 6 to be easily attached to the support 13 of the external control station 5.

Figure 6:
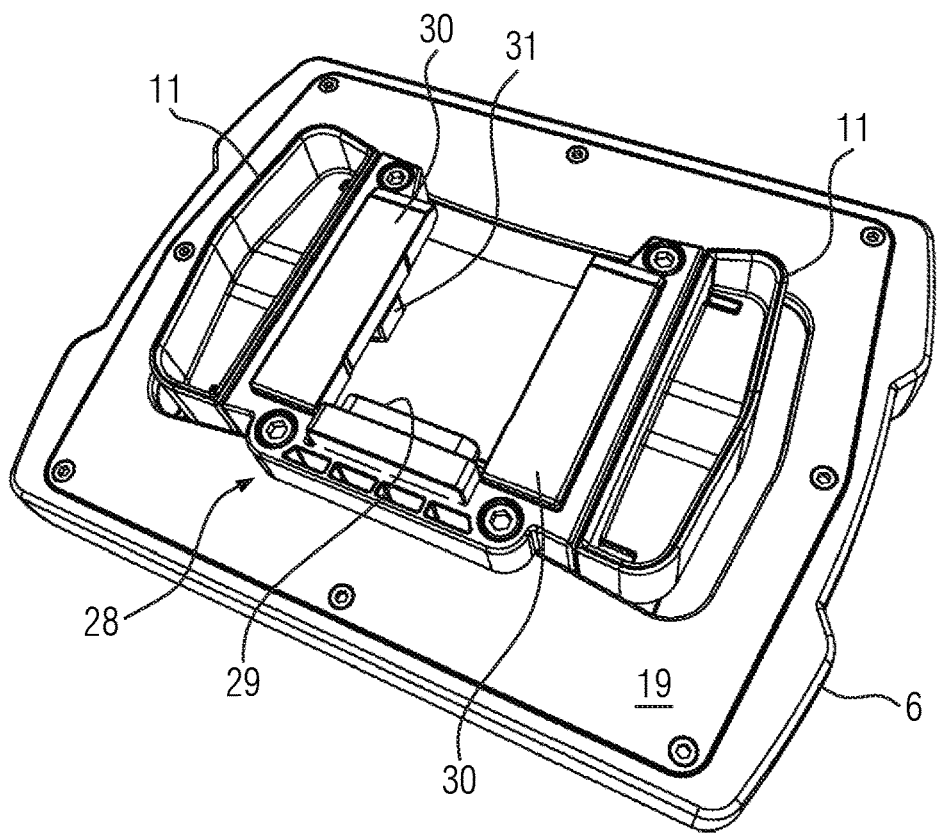
FIG. 6 shows a part of the plug connection device formed on the operating panel of the external control station.

The second pug connector part 28 of the plug connection device 27, shown in FIG. 6, has a second electrical contact part 29 integrally formed thereon and insertable into the first electrical contact part 23, which is dockable to the first electrical contact part 23 of the first connector part 22 of FIG. 5 to establish an electrical coupling on contact.

As shown in FIG. 6, the second plug connector part 28 is formed on the underside 19 of the operating panel 6. The plug connection device 27 has two parallel mounting rails 30 on the second plug connector part 28, which together with the guide rails 24 shown in FIG. 5 form the linear guide 25. Also shown on the underside 19 of the operating panel 6 are two laterally sliding handles 11, which can be manually operated by the operator to attach and detach the operating panel 6 to the support 13. The two handles 11 each comprise a locking projection 31, which allows the operating panel 6 to be secured to the mounting 13, in particular to the first plug connector part 22 formed on it, and to be electrically coupled, in particular when preloaded under pressure.

Figure 7:
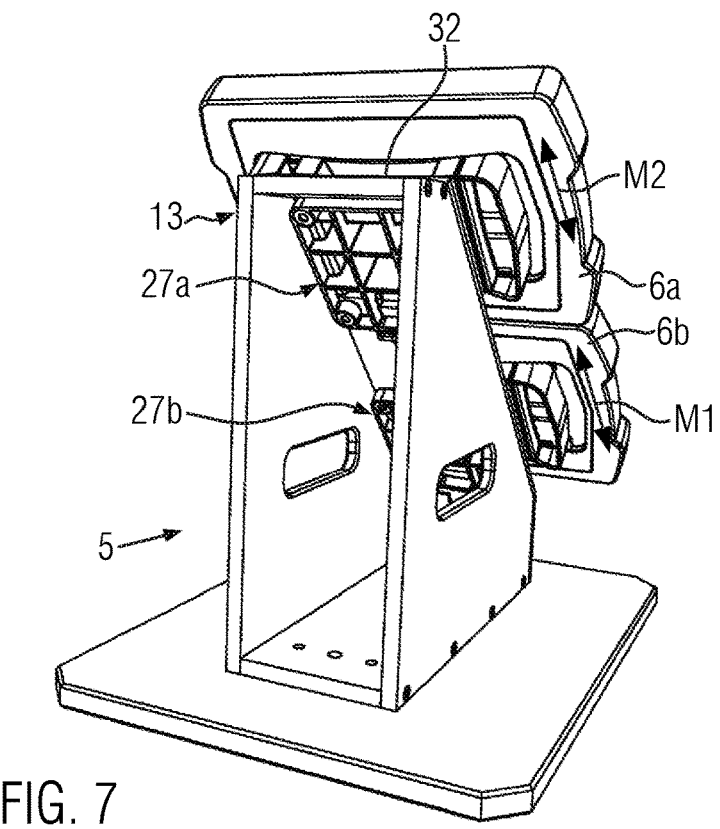
FIG. 7 shows a schematic and perspective view from behind of an external control station with two separate operating panels.

FIG. 7 shows a schematic rear view of an external control station 5 of the paving screed 3 with two separately mounted operating panels 6a, 6b. A separate plug connection device 27a, 27b is provided on the support 13 for each of the operating panels 6a, 6b to detachably attach the respective operating panels 6a, 6b to the external control station 5.

FIG. 7 also shows that the two operating panels 6a, 6b are arranged one above the other in a common schematically indicated mounting plane 32 on support 13. The two operating panels 6a, 6b can be attached to the support 13 in opposite mounting directions M1, M2 and can be removed in opposite directions.

Figure 8:
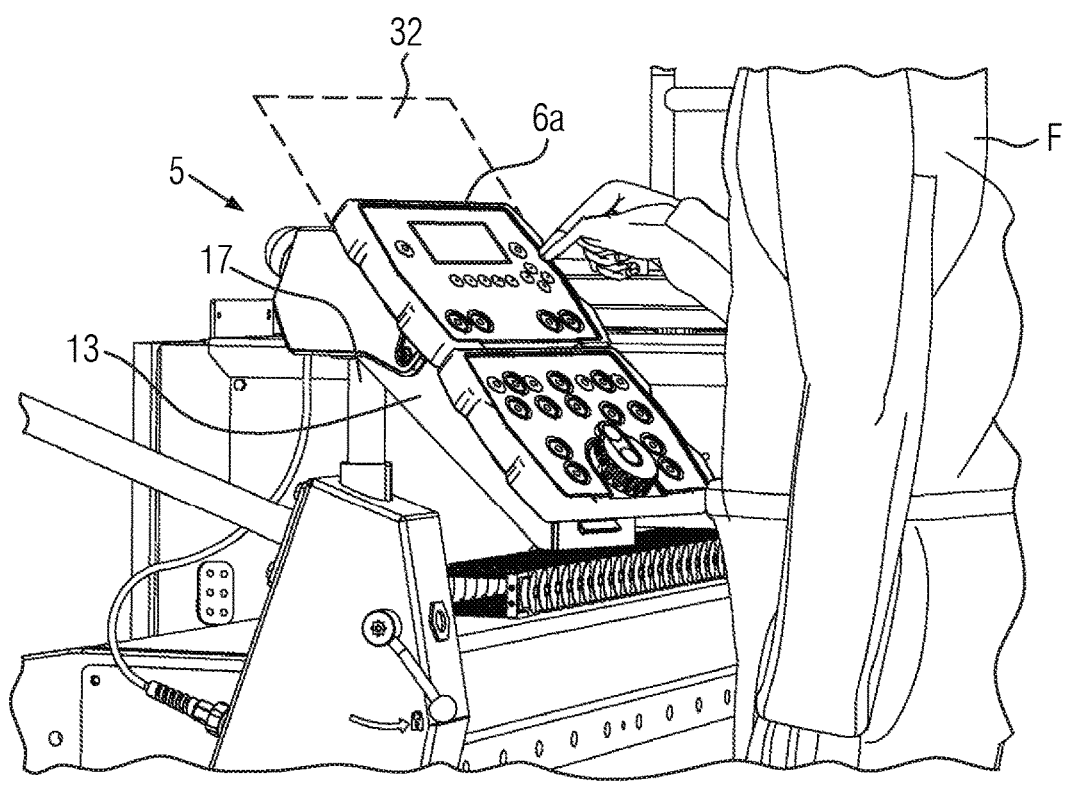
FIG. 8 shows a perspective view of an external control station of the paving screed with two operating panels mounted on it.

FIG. 8 shows a schematic perspective view of an external control station 5 with two operating panels 6a, 6b mounted one above the other on the support 13 along the mounting plane 32, which are arranged as separate control modules on support the 13. An operator F is positioned behind the external control station 5. The respective operating panels 6a, 6b can be removed separately from the support 13 by the operator F as input units in order to be used as mobile input units in the area of the road finisher 1, especially in the area of the paving screed 3.

Figure 9:
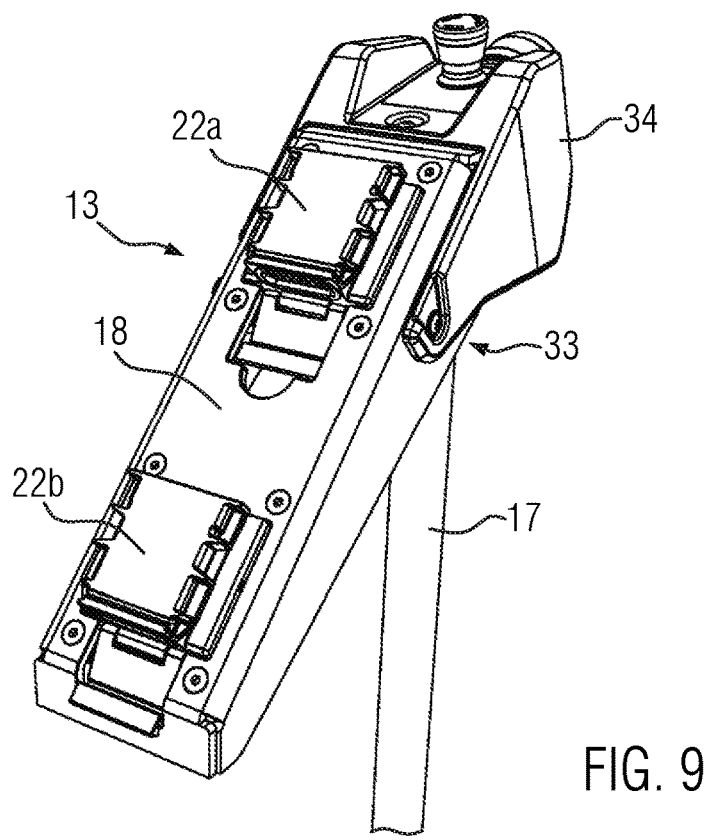
FIG. 9 shows a support of an external control station for mounting two separate operating panels.

FIG. 9 shows a support 13 for mounting two separately designed operating panels 6a, 6b. On the base plate 18 of the support 13, the first plug connector parts 22a, 22b are formed one above the other for attaching the respective operating panels 6a, 6b. FIG. 9 also shows that the base plate 18 is attached to an upper part 34 of the support 13 by means of a swivel joint 33. The swivel joint 33 allows the base plate 18 to be adjusted to a desired inclined position to align the operating panels 6a, 6b attached to the support 13.

Figure 10:
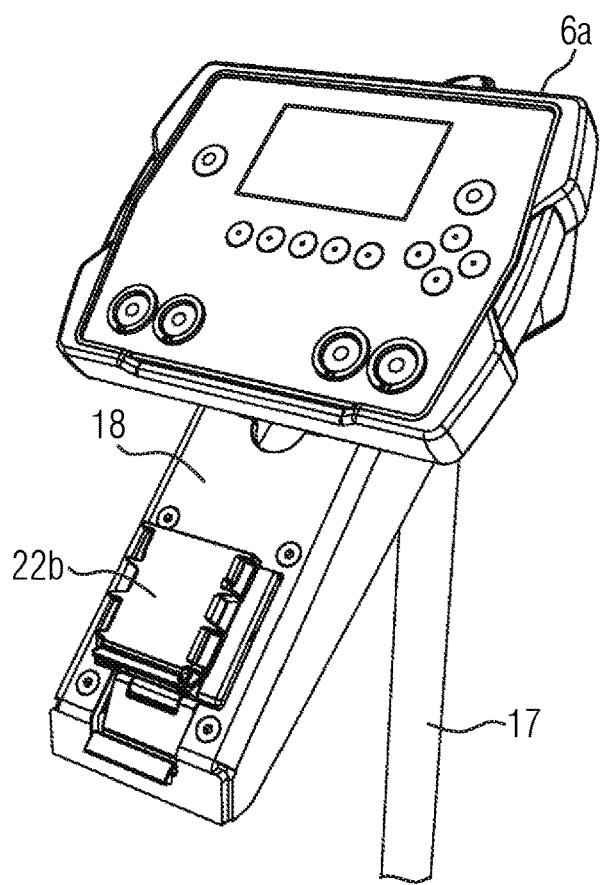
FIG. 10 shows the support of FIG. 9 with only one operating panel attached.

FIG. 10 shows the free support 13 shown in FIG. 9 with an operating panel 6a attached to the upper first plug connector part 22a.

The features described in connection with the plug connection device can be used both on an external control station for the attachment of one or more separate operating panels. Regardless of whether the paving screed is equipped with a single or multiple operating panels, the operating panels can be ergonomically connected and disconnected both mechanically and electrically from the external control station in a single coupling procedure.

What is claimed is:

1. A paving screed for compacting a paving material, the paving screed comprising an external control station for an operator for controlling at least one operating parameter adjustable at the paving screed, wherein the external control station comprises a support and an operating panel detachably attached thereto as an input unit for the operator for setting the at least one operating parameter, wherein the operating panel is attached to the support by means of a plug connection device, wherein the plug connection device comprises a first plug connector part with a first electrical contact part integrated thereon and a second plug connector part with a second electrical contact part integrated thereon, wherein an electrical coupling of the contact parts integrated on the plug connector parts can be produced by a mechanical coupling of the two plug connector parts, and wherein one of the at least one operating parameter comprises a screed paving width.

2. The paving screed according to claim 1, wherein the first plug connector part is integrally formed on the support and the second plug connector part is integrally formed on the operating panel of the external control station.

3. The paving screed according to claim 1, wherein the plug connection device includes a locking mechanism having at least one spring-loaded handle on the operating panel.

4. The paving screed according to claim 3, wherein as a sign of correct attachment of the operating panel to the support, the handle is configured to protrude at least partially beyond an edge of the operating panel in a manner visible to an operator.

5. The paving screed according to claim 1, wherein the plug connection device comprises a linear guide for connecting the two plug connector parts.

6. The paving screed according to claim 5 further comprising at least one lighting unit provided on the plug connection device for lighting the linear guide.

7. The paving screed according to claim 5, wherein the linear guide has at least two guide rails arranged in parallel.

8. The paving screed according to claim 1, wherein the plug connection device is configured to establish the electrical coupling for the operating panel without cables.

9. The paving screed according to claim 1, wherein the operating panel at the external control station is arranged on a height-adjustable and/or inclinable base plate of the support.

10. The paving screed according to claim 1, wherein the support has a movably mounted protective flap formed thereon for the plug connection device.

11. The paving screed according to claim 1, wherein the external control station has a further, separately designed operating panel as an input unit for the operator for setting at least one operating parameter of the paving screed, wherein the further operating panel is detachably fastened to the support by means of a plug connection device provided specifically for this purpose.

12. The paving screed according to claim 11, wherein the two operating panels are arranged on the support next to or above one another in a common mounting plane.

13. The paving screed according to claim 11, wherein the two operating panels can be pushed onto the support in opposite plug-in directions to establish respective mechanical and electrical coupling.

14. The paving screed according to claim 1, wherein the external control station is attached to a side shifting device of the paving screed.

15. The paving screed according to claim 1 further comprising an additional external control station, wherein the external control station and the additional external control station are mounted on opposite sides of the paving screed.

16. The paving screed according to claim 1, wherein the plug connection device comprises pressure means configured to increase an electrical contact pressure at an end of the coupling process.

17. A road finisher for producing a road surface, the road finisher comprising the paving screed according to claim 1.

18. A paving screed for compacting a paving material, the paving screed comprising an external control station for an operator for controlling at least one operating parameter adjustable at the paving screed, wherein the external control station comprises a support and an operating panel detachably attached thereto as an input unit for the operator for setting the at least one operating parameter, wherein the operating panel is attached to the support by means of a plug connection device, wherein the plug connection device comprises a first plug connector part with a first electrical contact part integrated thereon and a second plug connector part with a second electrical contact part integrated thereon, wherein an electrical coupling of the contact parts integrated on the plug connector parts can be produced by a mechanical coupling of the two plug connector parts, and wherein the support comprises a height-adjustable and/or inclinable base plate, and the operating panel is arranged on the base plate.

19. A paving screed for compacting a paving material, the paving screed comprising a side shifting device, and an external control station for an operator for controlling at least one operating parameter adjustable at the paving screed, wherein the external control station is attached to the side shifting device and comprises a support and an operating panel detachably attached thereto as an input unit for the operator for setting the at least one operating parameter, wherein the operating panel is attached to the support by means of a plug connection device, wherein the plug connection device comprises a first plug connector part with a first electrical contact part integrated thereon and a second plug connector part with a second electrical contact part integrated thereon, wherein an electrical coupling of the contact parts integrated on the plug connector parts can be produced by a mechanical coupling of the two plug connector parts.

20. A road finisher for producing a road surface, the road finisher comprising the paving screed according to claim 19.

* * * * *